United States Patent [19]

Mattwell

[11] 4,144,722
[45] Mar. 20, 1979

[54] AIR CONDITIONING SYSTEM WITH SIDE STREAM FILTERING

[76] Inventor: Michael O. Mattwell, 1 Daniel Dr., Glen Cove, N.Y. 11542

[21] Appl. No.: 786,181

[22] Filed: Apr. 11, 1977

[51] Int. Cl.$^2$ .................................................. F28D 5/00
[52] U.S. Cl. ........................................ 62/305; 62/310
[58] Field of Search ................. 62/305, 310, 118, 78; 165/50, 19, 27, 34; 261/DIG. 11

[56] References Cited

U.S. PATENT DOCUMENTS

| | | | |
|---|---|---|---|
| 2,667,766 | 2/1954 | Cummings | 62/305 |
| 3,009,331 | 11/1961 | Hewett et al. | 62/310 |
| 3,490,517 | 1/1970 | Meckler | 62/305 |
| 3,995,443 | 12/1976 | Iversen | 62/310 |

Primary Examiner—Lloyd L. King
Attorney, Agent, or Firm—Watson, Leavenworth, Kelton & Taggart

[57] ABSTRACT

An air conditioning system having an open condenser water circuit, a refrigeration unit, a closed heat exchange water circuit, and shunt circuits interconnecting the two water circuits to bypass the refrigeration unit, is provided with various side stream filtering arrangements for removing contaminants from the common water supply which have been picked up in passing through the cooling tower. One embodiment employs a centrifugal separator connected in shunt with the condenser water pump. Another embodiment employs a mechanical filter in shunt with a bypass line in the heat exchange water circuit with valving for selectively placing the filter in series with the condenser or the cooling coils. The second embodiment can be used in combination with the first embodiment. Improved backwashing and water conservation is achieved with the second embodiment by feeding backwash water during backwashing of the second filter through a further filter back to a point upstream of the condenser water pump but downstream of the cooling tower. Chemical treatment of the water is replaced by an electrodynamic-ultrasonic treatment device in side stream relation to a section of the open condenser water circuit. When required a closed loop filtration system is connected directly to the cooling tower drawing water from its sump and returning it directly after filtering. A water level sensor in the cooling tower controls a throttling valve downstream of the main pump to prevent the water from dropping below a safe level due to excessive load.

18 Claims, 5 Drawing Figures

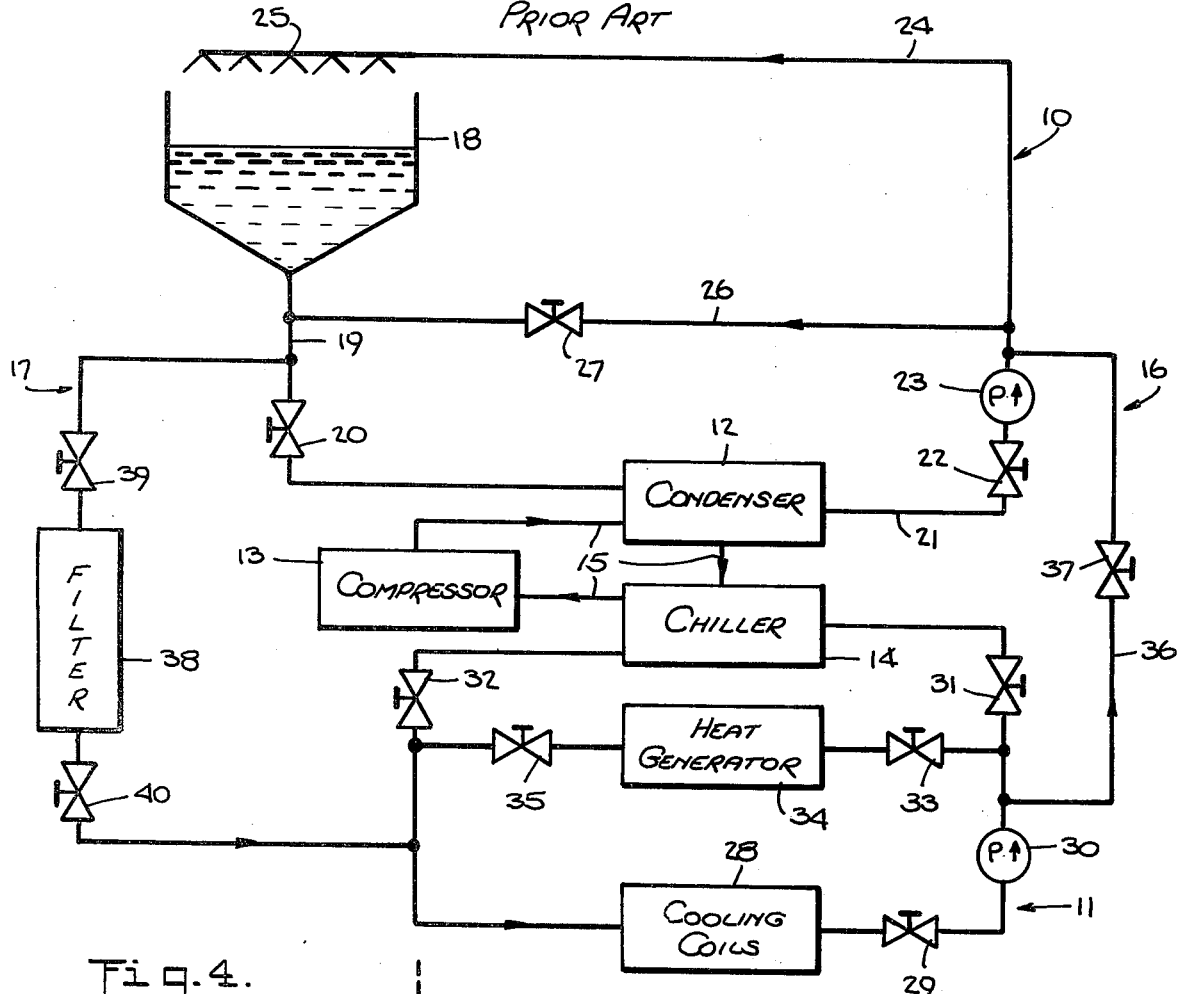
Fig. 1. PRIOR ART
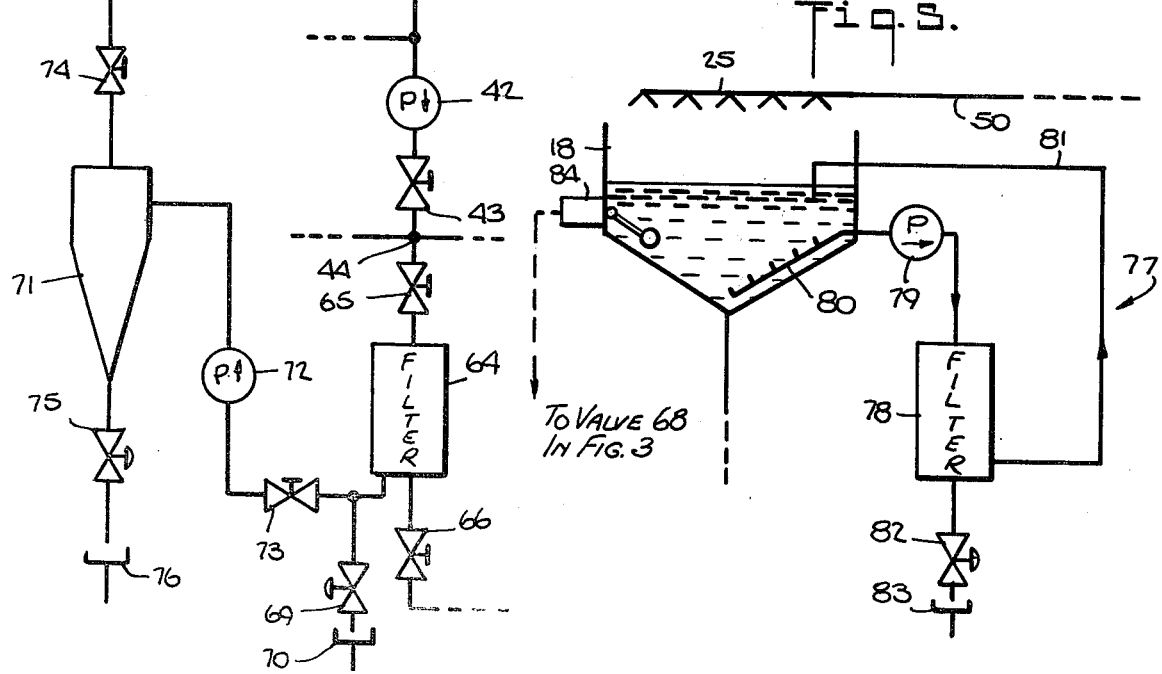
Fig. 4.
Fig. 5.

AIR CONDITIONING SYSTEM WITH SIDE STREAM FILTERING

This invention relates to an air conditioning system, and more particularly to a system in which a condenser, compressor, chiller type refrigeration unit is interposed between an open condenser water circuit and a closed heat exchange water circuit with valve controlled shunt water circuits interconnecting the open and closed water circuits for selectively bypassing the refrigeration unit.

A conventional air conditioning system for heating and cooling the interior of a building includes equipment for circulating water through coils or the like throughout the building in a closed piping circuit to either extract or give up heat from or to the air surrounding said coils depending upon whether the system is in its heating or cooling mode. In its heating mode the water in the closed piping circuit is passed through a suitable heat generator. In its cooling mode the water is passed through the chiller coils of a refrigeration unit. In order to remove heat from the chiller coils a refrigerant is circulated by a compressor through the chiller and an associated condenser unit. The condenser unit is cooled by circulating a second liquid, condenser water, in a separate piping circuit through a cooling tower to reduce the temperature of said condenser water. The cooling tower is open and the water therein is exposed to the environment and airborne contamination.

A modification of the above system, in use for many years, utilizes during certain times of the year when only moderate cooling of the building interior is required and the wet bulb temperature of the outside air is low enough to cool the water circulating in the water tower to an effectively low cooling temperature, a single liquid in common to both the cooling tower and cooling coil circuits. The piping is arranged to circulate the liquid from the output of the cooling tower through filters to remove large particle contaminants and then into the chilled water piping circuit bypassing the refrigeration unit.

Also, in the known systems, provision is made for introducing chemicals into the liquid circulating through the cooling tower to control corrosion, scaling, piping deterioration, bacteria, algae and the like. The reason for this is that the liquid in the conventional cooling tower picks up a portion of the airborne particles and other contaminants which, when introduced into the piping circuits, can cause serious damage through film and sludge build-up, corrosion, pitting and clogging with attendant loss in efficiency and premature failure of equipment.

The known systems have the drawback, however, that the arrangement of and choice of equipment for filtering the contaminants from the water have been based upon in-line or main stream concepts requiring either unduly large filters or gross compromise on the filtering efficiency or both. Because the in-line filter must handle all of the flow volume the filter cannot remove particles much smaller than about 125 microns diameter without unduly restricting the liquid flow. Moreover, the filters must be cleaned frequently and require extensive backwashing with attendant waste of water and water treatment chemicals. Where backwashing is accomplished with greatly increased flow of water, the flow sometimes exceeds the capacity of the cooling tower to refill causing starvation of the water pumps with attendant damage.

An object of the present invention is to avoid the drawbacks of the prior known systems with attendant savings in energy, chemicals and other maintenance factors.

Another object of the present invention is to eliminate the need for chemicals for treating the water.

A further object of the invention is to provide a system whereby filtering can be accomplished to remove particles down to at least 10 microns size without adversely affecting the flow and operating efficiency of the entire system.

In accordance with one aspect of the invention, there is provided an air conditioning system in which condenser, compressor, chiller type refrigeration means is interposed between an open condenser water circuit and a closed heat exchange water circuit, and valve controlled shunt water circuits interconnect said open and closed water circuits for selectively bypassing said refrigeration means, characterized in that a water pump is disposed in said open water circuit, and a side stream filtering device is connected in parallel with said pump.

Alternatively, or in combination, the system may be characterized in that one of said shunt water circuits comprises a valve controlled water line in parallel with a side stream filtering device capable of removing particles down to at least 10 microns size.

In accordance with yet another aspect of the invention, the system is characterized in that a combined electrodynamic-ultrasonic water treating device is connected in shunt with a section of the open water circuit.

The invention will be better understood after reading the following detailed description of the presently preferred embodiments thereof with reference to the appended drawings in which:

FIG. 1 is a schematic diagram illustrating the prior art system;

FIG. 4 is a fragmentary schematic diagram showing a modification of the system of FIG. 3; and FIG. 5 is a fragmentary schematic diagram showing a modification of any of the embodiments of FIGS. 2, 3 and 4.

Figure 2:
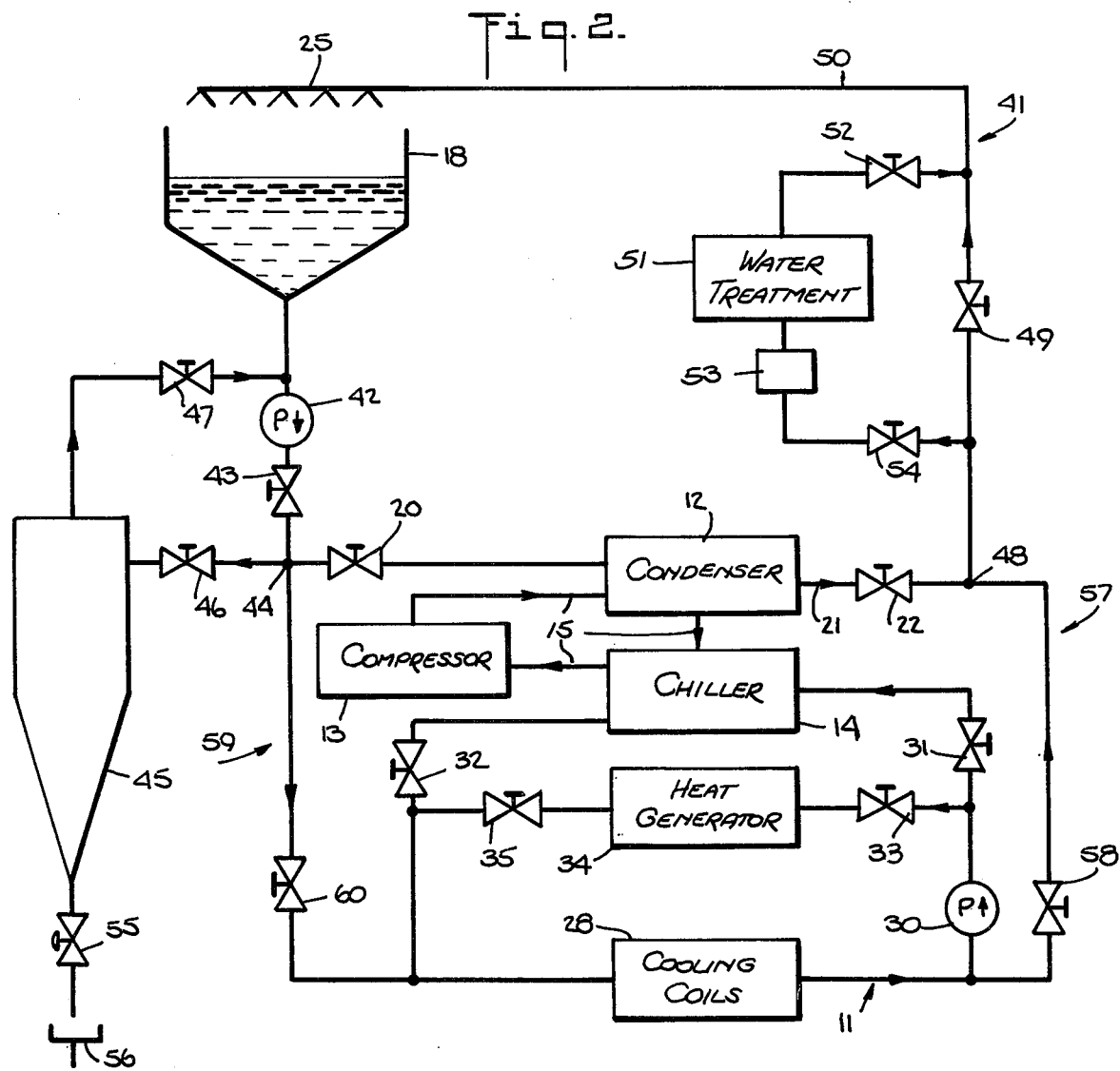
FIG. 2 is a schematic diagram illustrating an embodiment of the present invention.

Reference should now be had to the drawings wherein the same reference numerals are used throughout to designate the same or similar parts. The known prior art system is shown in FIG. 1. It includes an open water circuit 10, a closed water circuit 11, an interconnecting refrigeration unit consisting of a condenser 12, a compressor 13 and a chiller 14 with interconnecting piping 15 containing refrigerant, and valve controlled shunt water circuits 16 and 17 for selectively bypassing the refrigeration unit.

As seen in FIG. 1, the open water circuit 10 includes a cooling tower 18 connected through piping 19 and a valve 20 to one side of condenser 12, the other side of which is connected through a pipe section 21 and a valve 22 to the inlet of a pump 23 whose outlet is connected via piping 24 to a spray head 25 at the top of the cooling tower 18. A shunt line 26 controlled by a valve 27 bypasses the cooling tower 18.

The closed water circuit 11 includes the cooling coils 28 connected through valve 29 to the inlet of pump 30 whose outlet is connected either through valve 31, chiller 14, and valve 32 back to the cooling coils 28, or through valve 33, heat generator 34 and valve 35 back to cooling coils 28.

Shunt circuit 16 consists of piping 36 and valve 37 connected from the outlet of pump 30 to the outlet of pump 23. The other shunt circuit, 17, consists of a filter 38 in series with inlet and outlet valves 39 and 40 connected from the outlet of the cooling tower 18 to the inlet of the cooling coils 28.

With the system of FIG. 1, when it is desired to interconnect the open and closed water circuits the refrigeration unit is maintained inoperative, valves 20 and 22 as well as 31 and 32 are closed and valves 37, 39 and 40 are opened. Hence, it should be apparent that the entire water flow passes through filter 38 in a series or main line circuit to cooling coils 28.

Turning now to FIG. 2, there is shown one embodiment of the present invention. Those components which are essentially the same as the components contained in the system of FIG. 1 are identified in FIG. 2 with the same reference numerals. Open water circuit 41 includes, starting at the outlet of cooling tower 18, a water pump 42 whose output is fed through a valve 43 to a piping junction 44. A side stream filtering device 45 consisting of a centrifugal separator or the like is connected through valves 46 and 47 in shunt with the pump 42. Piping junction 44 is connected, as shown, through valve 20, condenser 12 and valve 22 to another piping junction 48. The junction 48 is then connected through a valve 49 and piping 50 back to the spray head 25 of the cooling tower 18. Connected in shunt with valve 49 is a water treatment device 51, the outlet of which is connected through a valve 52 and the inlet of which is connected through a flow meter 53 and a valve 54. This completes the open water circuit.

Preferably, the centrifugal separator 45 has a flow capacity and particle removal rate such that something on the order of 2% to 5% of the flow capacity of the open water circuit 41 under the drive of pump 42 is bypassed through the filter. The particle removal capacity preferably is down to at least 10 microns size. Removing particles down to the 10 microns size is feasible in view of the fact that only a fraction of the total water flow passes through the filter at any one time. However, eventually, from a statistical standpoint, all of the water in the system will have passed through the filter 45. If necessary, a coarse strainer, not shown, can be disposed at the inlet to pump 42 to eliminate any large particles. Whenever the solid matter extracted by filter 45 reaches a predetermined level said filter may be backwashed or flushed automatically in known manner. This is shown schematically by the drain valve 55 draining into a sump 56.

The water treatment device 51 preferably consists of a combined electrodynamic-ultrasonic water treatment device either the same as or equivalent to that sold under the trademark "ELECTR-A-SONIC" by Allen Industries, Inc. of Erie, Pennsylvania. The electrodynamic-ultrasonic water treatment device 51 controls the algae and bacteria and charges the dissolved and suspended solids in the water passing therethrough preventing scale and corrosion particularly in the normally clean, closed water circuit. The method by which the water treatment device 51 operates forms no part of the present invention although it is believed that use of said device in the open condenser water circuit is novel. The device 51 eliminates the need for essentially all chemical treatment of the water.

A shunt water circuit 57 controlled by a valve 58 is connected from the inlet side of pump 30 to the junction 48. Another shunt water circuit 59 controlled by the valve 60 is connected from junction 44 to the inlet to cooling coils 28.

Figure 3:
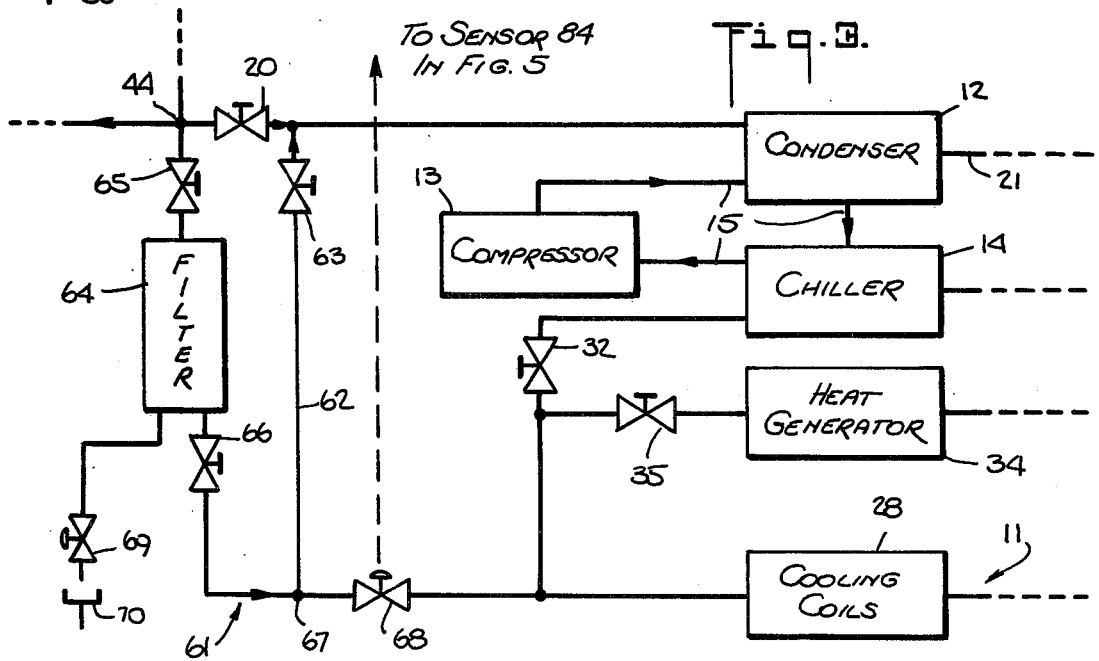
FIG. 3 is a fragmentary schematic diagram showing a modification of the system of FIG. 2.

Depending upon the contamination of the atmosphere or environment under which the air conditioning system must operate, it may be desirable to include in the system a further filtering arrangement such as shown in FIG. 3 to which attention is now invited. Again, only those parts which are essential to show the manner in which the modification is applied to the system of FIG. 2 are shown in FIG. 3 with the same parts being identified by the same reference numerals. As seen therein, the shunt water circuit 61 comprises a water line 62 controlled by a valve 63 and connected in shunt with a side stream filtering device 64 capable of removing particles down to at least 10 microns size. The filter 64 is connected in series with valves 65 and 66 between the junction 44 and a junction 67 between line 62 and a valve 68. The opposite side of valve 68 connects to the inlet to cooling coils 28.

It should be observed that water line 62 is connected at one end between valve 20 and condenser 12 rather than to junction 44. The purpose for this arrangement will be evident from an understanding of the operation of the system. That is, when it is intended to bypass the refrigeration unit, flow through the condenser 12 can be interrupted by shutting valve 22 (see FIG. 2) while valves 20 and 63 are opened and proportioned relative to filter 64 such that only a portion of the total flow passes through filter 64 from junction 44 to junction 67. The flow through line 62 will be reversed from the direction of the arrow in FIG. 3. When, however, the mode of operation is altered so that the water from the cooling tower 18 is to pass through condenser 12 rather than through the closed water circuit, valve 68 can be closed causing the flow through line 62 to reverse and placing the filter 64 effectively in shunt with valve 20. Again, the valves 20 and 63 can be adjusted relative to valves 65 and 66 such that at any instant the desired proportion of the entire water flow passes through filter 64 with the remainder passing through valve 20 directly to condenser 12. More, specifically, during summer operation, when the open water circuit 41 is independent of the closed water circuit 11, it is desirable to utilize filter 64 to filter contaminants in the open water circuit 41 by opening valves 63, 65 and 66 and closing valves 20 and 68. Where the capacity of filter 64 is not large enough to handle the full flow of the water circuit 41, valve 20 may be opened to throttling position to bypass flow from filter 64.

Filter 64 may be another centrifugal separator similar to filter 45 in FIG. 2, or it may take the form of a suitable mechanical filter or the like having the requisite flow rate and the ability to remove particles preferably down to at least 10 microns size. Backwashing can be achieved through valve 69 emptying into sump 70.

Under certain conditions filter 64 may be adequate for handling the entire system in which case the filter 45 can be eliminated along with accessory valving 46 and 47 and elements 55 and 56.

If it is necessary to employ a filter 64 requiring substantial backwashing water, or it is desired to conserve the water in the system for any reason, the modification shown in FIG. 4 may be employed. As shown, another filtering device such as the centrifugal separator 71 has its inlet connected through a pump 72 and valve 73 to the drain from filter 64. The outlet from separator 71 passes through a valve 74 to the inlet of pump 42. Separator 71 may also be provided with a suitable drain controlled by a valve 75 emptying into a sump 76.

Occasionally, the environment is so heavily contaminated that preliminary filtering is required of the water in the cooling tower before it passes to the water pump 42. In such event, a filtering system may be connected in a closed loop 77 with the cooling tower as shown in FIG. 5. The loop 77 contains the filter 78 and a pump 79 plus suitable piping such as the loop of piping 80 with inlet holes installed around and near the outlet of the cooling tower pan or other convenient location and connected to pump 79. The outlet from the filter 78, after passing through pipe section 81, is fed back into the cooling tower. A backwash line is provided with a valve 82 draining into a sump 83. Filter 78 may take the form of a high rate sand filter capable of removing particles at least down to 10 microns before discharging the filtered water. Preferably, the filter should be arranged to pass the entire volume of water of the cooling tower 20 to 30 times every 24 hours.

Referring again to the modification illustrated in FIG. 3, it will be found on occasion, particularly where the mechanical equipment rooms are in close proximity to the cooling tower 18 and where a low head pump 42 is utilized, that there is insufficient pressure across filter 64 to backwash satisfactorily the strainer elements when filter 64 is of the mechanical type and particularly where the back pressure is high on the backwash discharge line. Wherever such condition is encountered, valve 66 can be throttled to a preset position whenever the filter 64 goes into its backwash mode so that the overall flow is decreased. This will result in pump 42 increasing its discharge pressure and thereby providing sufficient backwash pressure to clean adequately the filter elements in filter 64. Valve 66 is returned to its full open position during normal system operation. Appropriate automatic controls can be provided, as desired, for performing the manipulation of valve 66.

In certain installations, where considerable backwash flow is required to clean adequately the strainer elements of the filter, the total demand for make-up water may exceed the capacity provided and the water in the cooling tower may drop to a dangerous level. Damage to the components can be avoided by incorporating the arrangement that will now be described with reference to FIG. 5. A water level sensor 84 is installed in the cooling tower 18 to sense the water level in the tower pan. Sensor 84 is operatively connected to a throttle valve downstream of water pump 42 such as valve 68 in FIG. 3. If the tower water level falls below the setting of sensor 84, a condition that might be brought about during backwashing filter 64 to drain 70, valve 68 can be throttled automatically to reduce the overall flow.

Wherever a specific type of filter has been described in connection with the various embodiments of FIGS. 3, 4 and 5, it should be understood that other suitable filtering devices can be substituted so long as they have the requisite performance characteristics. Backwashing of the various filters can be controlled automatically either through an appropriate solids sensor or a programmed timer in known manner. Various other changes can be made in the described systems as will occur to those skilled in the subject art without departing from the true spirit of the invention as defined in the appended claims.

What is claimed is:

1. An air conditioning system in which condenser, compressor, chiller type refrigeration means is interposed between an open condenser water circuit and a closed heat exchange water circuit, and a plurality of valve controlled shunt water circuits interconnect said open water circuit with said closed water circuit for selectively bypassing said refrigeration means and passing water between said open and closed water circuits, characterized in that a water pump is disposed in said open water circuit, and a side stream filtering device is connected in a separate circuit in shunt with said pump independent of said closed water circuit.

2. An air conditioning system according to claim 1, characterized in that said filtering device is a centrifugal separator capable of removing particles down to at least 10 microns size.

3. An air conditioning system according to claim 2, characterized in that said centrifugal separator has a flow capacity on the order of 2% to 5% of the flow capacity of said open water circuit under the drive of said pump.

4. An air conditioning system according to claim 2, characterized in that a combined electrodynamic-ultrasonic water treatment device is connected in shunt with a section of said open water circuit.

5. An air conditioning system according to claim 1, characterized in that a combined electrodynamic-ultrasonic water treatment device is connected in shunt with a section of said open water circuit.

6. An air conditioning system according to claim 1, characterized in that one of said shunt water circuits comprises a valve controlled water line in shunt with a further side stream filtering device capable of removing particles down to at least 10 microns size.

7. An air conditioning system according to claim 6, characterized in that additional valves are disposed in said water circuits for selectively reversing the direction of water flow through said valve controlled water line for permitting said further filtering device to be used both when the water in said open water circuit flows through said condenser isolated from said closed water circuit, and flows through said closed water circuit isolated from said condenser.

8. An air conditioning system according to claim 6, characterized in that a backwash circuit is connected from said further filtering device through another filtering device to a point in said open water circuit upstream of said pump.

9. An air conditioning system according to claim 1, characterized in that a filtering system is connected in a closed loop with a cooling tower in said open water circuit independent of both said open water circuit and said closed water circuit for removing particles from the water in said cooling tower down to at least 10 microns size.

10. An air conditioning system in which condenser, compressor, chiller type refrigeration means is interposed between an open condenser water circuit and a closed heat exchange water circuit, and a plurality of valve controlled shunt water circuits interconnect said open water circuit with said closed water circuit for selectively bypassing said refrigeration means and passing water between said open and closed water circuits, characterized in that one of said shunt water circuits comprises a valve controlled water line in shunt with a side stream filtering device capable of removing particles down to at least 10 microns size.

11. An air conditioning system according to claim 10, characterized in that a combined electrodynamic-ultrasonic water treatment device is connected in shunt with a section of said open water circuit.

12. An air conditioning system according to claim 10, characterized in that additional valves are disposed in said water circuits for selectively reversing the direction of water flow through said valve controlled water line for permitting said filtering device to be used both when the water in said open water circuit flows through said condenser isolated from said closed water circuit, and flows through said closed water circuit isolated from said condenser.

13. An air conditioning system according to claim 10, characterized in that a backwash circuit is connected from said filtering device through another filtering device to a point in said open water circuit upstream of a water pump.

14. An air conditioning system according to claim 10, characterized in that a filtering system is connected in a closed loop with a cooling tower in said open water circuit independent of both said open water circuit and said closed water circuit for removing particles from the water in said cooling tower down to about 10 microns size.

15. An air conditioning system according to claim 10, characterized in that a water pump is disposed in said open water circuit and a centrifugal separator capable of removing particles down to at least 10 microns size is connected in shunt with said pump.

16. An air conditioning system according to claim 1, characterized in that said open condenser water circuit includes a cooling tower having a low level water sensor in its tower pan operatively coupled to a throttling valve downstream of said water pump for reducing the load on said cooling tower whenever the water in said tower pan falls below a safe level.

17. An air conditioning system according to claim 10, characterized in that said open condenser water circuit includes a water pump and a cooling tower, with said cooling tower having a low level water sensor in its cooling tower pan operatively coupled to a throttling valve downstream of said water pump for reducing the load on said cooling tower whenever the water in said cooling tower pan falls below a safe level.

18. An air conditioning system in which condenser, compressor, chiller type refrigeration means is interposed between an open condenser water circuit and a closed heat exchange water circuit, said open water circuit includes a cooling tower and a water pump, and a filter requiring backwashing is disposed in at least one of said circuits, characterized in that said cooling tower has a low level water sensor in its tower pan operatively coupled to a throttling valve downstream of said water pump for reducing the load on said cooling tower whenever the water in said tower pan falls below a safe level.

* * * * *